Figure 1:
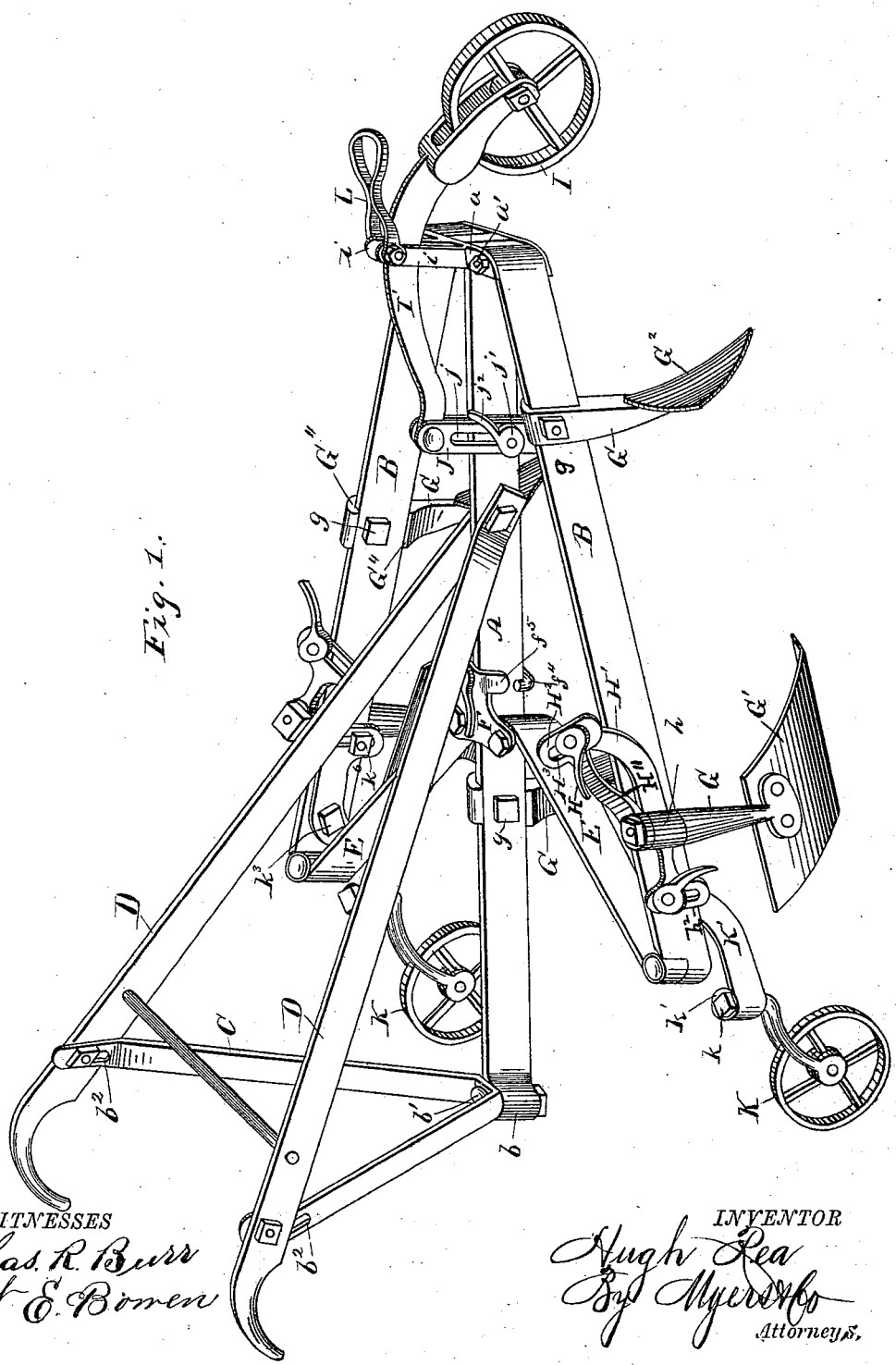

(No Model.) 4 Sheets—Sheet 1.

H. REA.

COMBINED PLOW AND CULTIVATOR.

No. 291,772. Patented Jan. 8, 1884.

WITNESSES
Chas. R. Burr
W. E. Bowen

INVENTOR
Hugh Rea
By Myers & Co.
Attorneys.

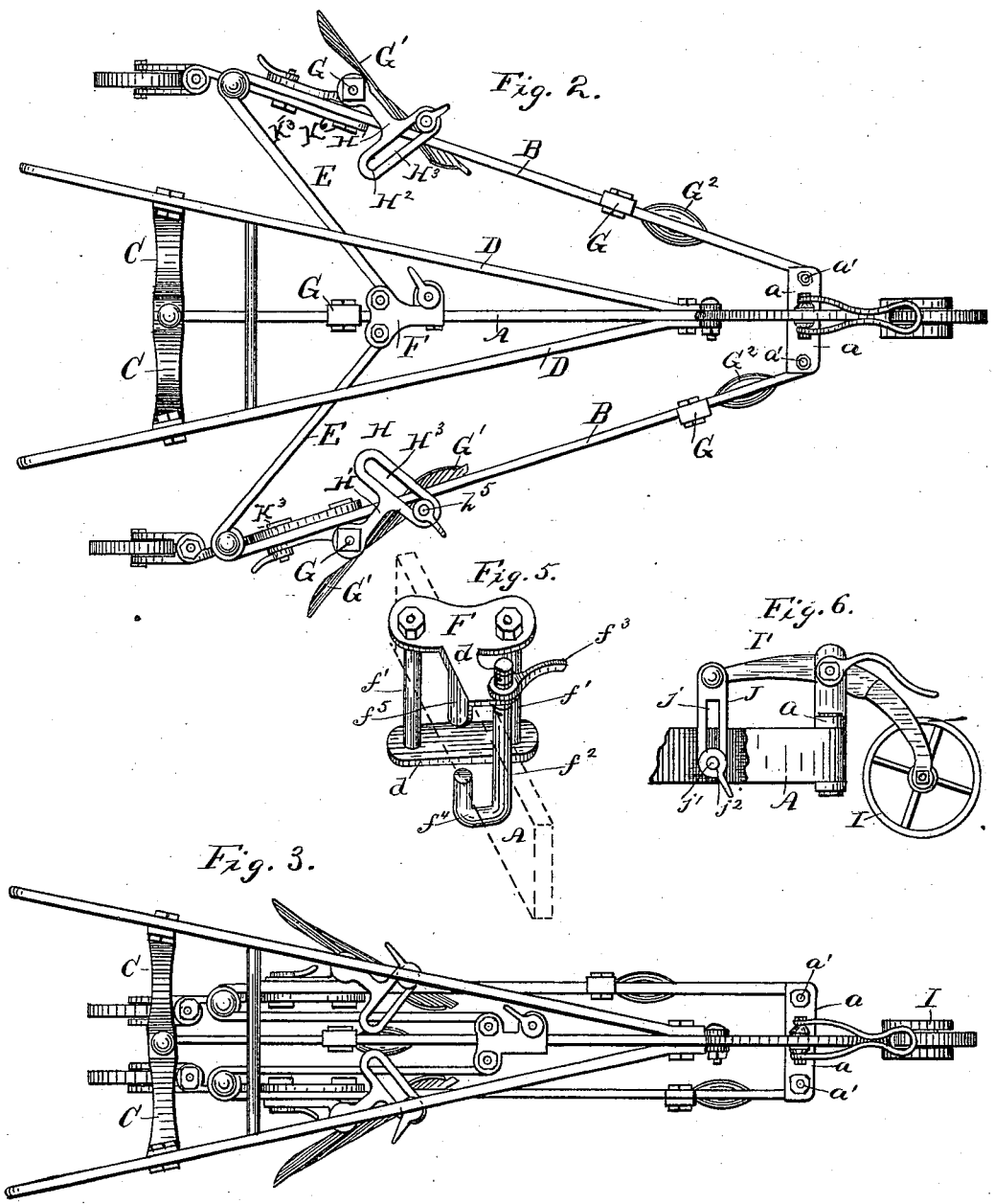

(No Model.)  4 Sheets—Sheet 3.
H. REA.
COMBINED PLOW AND CULTIVATOR.
No. 291,772. Patented Jan. 8, 1884.
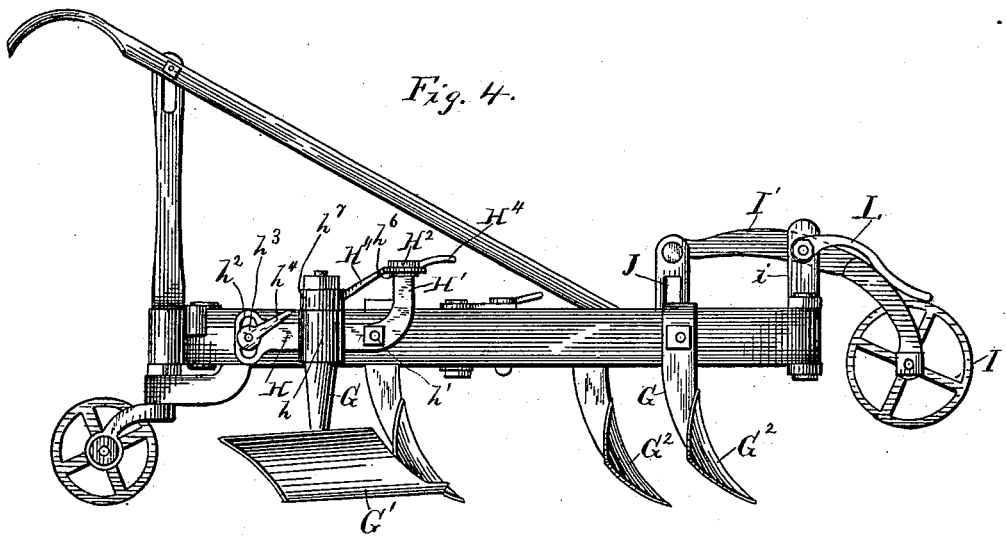
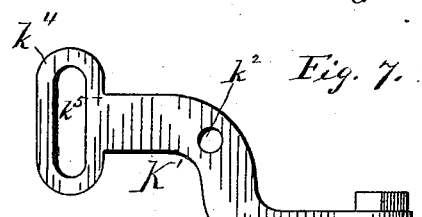
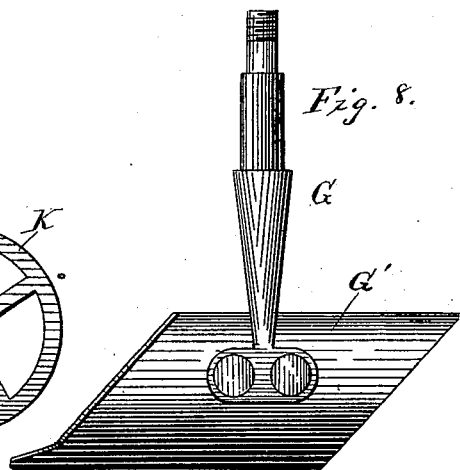
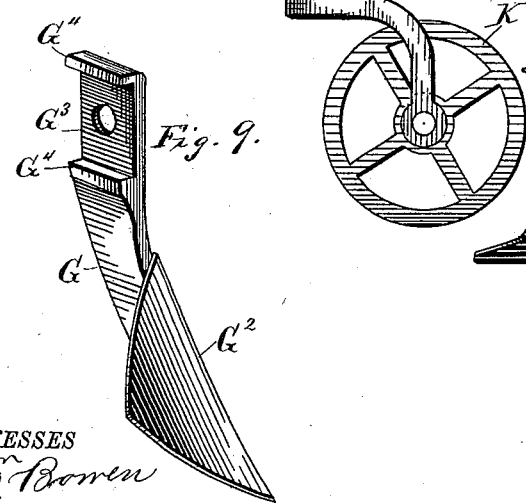
WITNESSES
W. E. Bowen
Geo. N. Harvey
INVENTOR
Hugh Rea
By Myers & Co.
Attorneys (No Model.)  4 Sheets—Sheet 4.
H. REA.
COMBINED PLOW AND CULTIVATOR.
No. 291,772.  Patented Jan. 8, 1884.
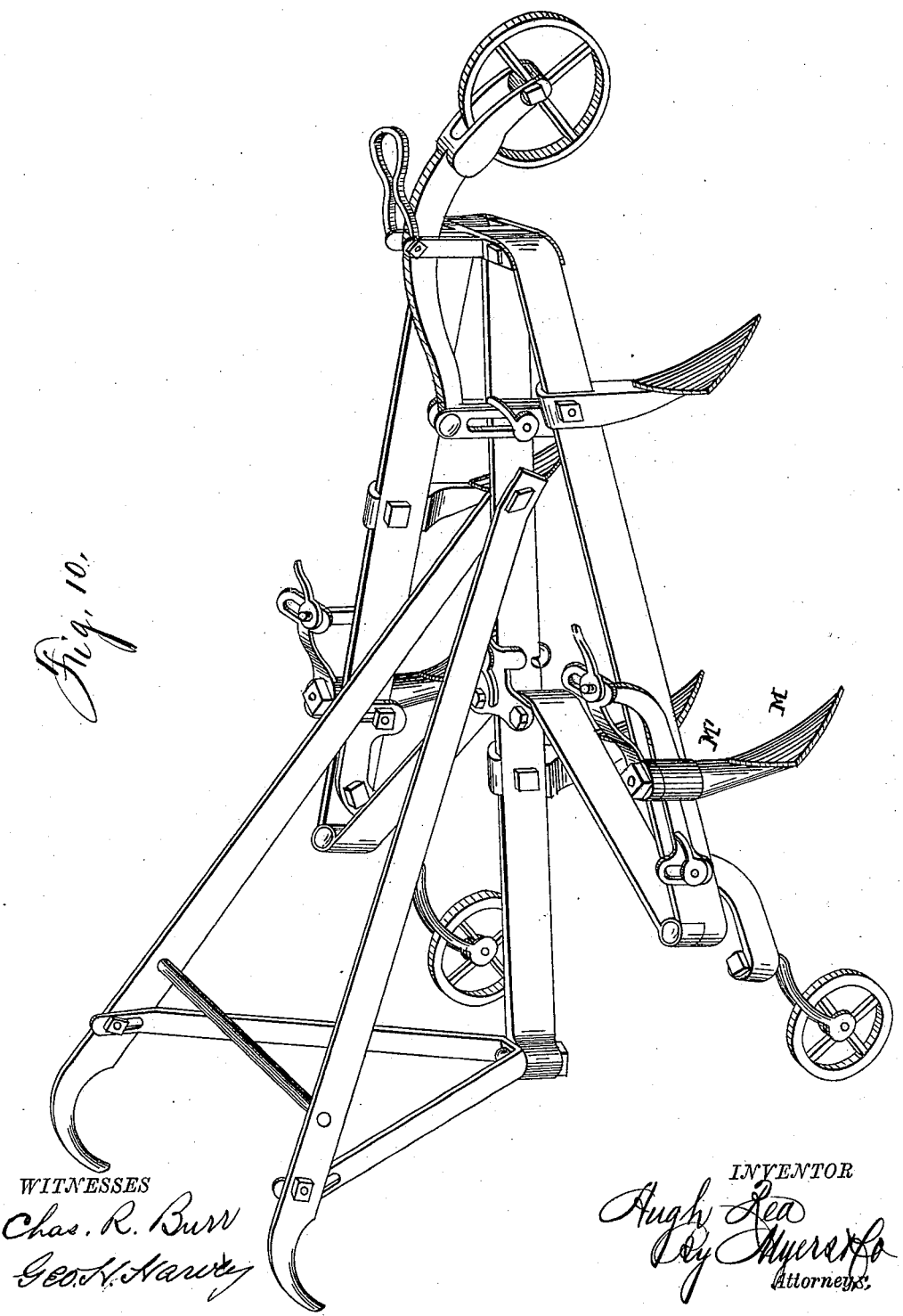

United States Patent Office.

HUGH REA, OF VILLAGE GREEN, PENNSYLVANIA.

COMBINED PLOW AND CULTIVATOR.

SPECIFICATION forming part of Letters Patent No. 291,772, dated January 8, 1884.

Application filed September 5, 1883. (No model.)

*To all whom it may concern:*

Be it known that I, HUGH REA, a citizen of the United States of America, residing at Village Green, in the county of Delaware and State of Pennsylvania, have invented certain new and useful Improvements in a Combined Plow and Cultivator, of which the following is a specification, reference being had therein to the accompanying drawings.

This invention pertains to improvements in cultivators, having for its object to effect the ready fastening of the plow-standards and the adjustment of the plows to vary their depth of penetration into the soil, and to enable the shifting of a single plow or cultivator shovel from one side to the other of the machine to cause it to act in the double capacity of an opening and a covering shovel, while it is rendered capable of ready transportation from place to place in the field without allowing the contact of the plows with the ground, which is undesirable; and it is adapted to permit the compact folding of the side or wing beams and adjustment of the plane of the plows.

To these ends the invention consists of the adjustability of the plows or shovels both vertically and horizontally; of vertically-adjustable wheels connected to the cultivator frame; of laterally-swinging beams, with pivoted connections to the main or central beam, and of the adaptation of the plow-standards to receive and permit their connection individually by a single bolt to the beams, substantially as hereinafter more fully set forth and claimed.

In the accompanying drawings, Figure 1 is a perspective view of my improved cultivator. Figs. 2 and 3 are plan views of the same, with the side beams or wings in one view extended, while in the other view they are folded. Fig. 4 is a side view. Figs. 5 to 9, inclusive, are detail views thereof; and Fig. 10 is a slight modification in perspective.

In the organization of my invention I employ a central beam, A, to the forward end of which, on each side, is pivoted the forward end of a lateral or swinging beam B, by short right-angularly-projecting plates $a\,a$, and bolts or pintles $a'\,a'$, passing through eyes of the said ends of the lateral beams or wings and apertures of said plates. The rear end of the central beam, A, is formed with an eye, $b$, through which is passed a bolt, $b'$, detachably securing the handle-braces $c$ thereon at their lower central connecting portion, the upper divergent ends of said braces being slotted and bolted, as at $b^2$, to the upper and near the outer ends of the handles D, and thus adjustably connected to said handles, to enable their adjustment according to and to accommodate the height of the attendant. The lateral beams or wings B are provided at their rear ends with pivoted or hinged arms or plates E, that are also pivoted or hinged to a saddle-plate F, adapted to rest and slide on the central beam, A. This saddle-plate is composed of two parallel plates, $d$, Fig. 5, (an upper and a lower one,) that are connected together by bolts $f'\,f'$, which form the pintles or pivots of the inner ends of the arms or plates E. The upper one of these plates is provided with a hooked bolt, $f^2$, the upper end of the latter having a tightening thumb-nut, $f^3$, while its lower hooked end, $f^4$, takes under and hugs the central beam, A, whereby, with the aid of the bolts $f'$ and a partition or flange, $f^5$, depending from the upper plate, the saddle-plate is enabled to be firmly clamped upon the central beam, either when the lateral beams are folded or extended to secure the latter as against movement. This arrangement also permits the extension and folding of the side beams, as occasion may require—*i. e.*, when needed for use, or when out of use, or to be shipped. In the latter case the handles are detached and laid upon the beams by removing the single bolt $b'$ from the central beam and from the handle-braces. The central and side beams are supplied with cultivator or plow standards G, plows or shovels G' being applied to the latter. The standards of the central beam plow or shovel and of the front plows of the lateral beams are recessed, as at $G^3$, Fig. 9, to receive and fit upon the said beams, said plow-standards being thus provided with an upper and a lower shoulder, $G^4$, one above and one below the recess, while the only other means to secure the standards upon the beams is a single bolt, $g$, Fig. 1, for each standard, said bolt being passed through the central beam and the standard. The standards G of the plows G' are secured in eyes or sleeves $h$, cast or formed upon plates H, pivoted, so as to have vertical movement, to the outer sides of the lateral beams B B on pivot $h'$, Fig. 4. The rear ends of the plates are provided with slightly-curved vertical slots $h^2$, through which pass from the lateral beams screw-bolts $h^3$, fitted with adjusting-nuts $h^4$, by means of which the plows G' are adapted to be adjusted vertically, so as to allow the same to take more or less soil, according to the depth it is desired to plow. The forward ends of the plates H are turned upward, as at H', and are reduced and shouldered, as at $h^6$ $h^6$, their reduced portions being cylindrical and screw-threaded.

H'' H'' are T-shaped plates, each having a middle diagonal portion and a sleeve, $h^7$, at one end, said sleeve having an internal angular surface, which fits and is nutted on a similar external surface of the upper end of the plow-standard, to effect the movement horizontally therewith of the plow. The opposite end of each plate has a cross-piece, $H^2$, which is provided with a horizontal slot, $H^3$, extending in the direction of the length of the cross-piece, thus being arranged at a right angle to the other portion of the plate. Upon the upper screw-threaded portion of the plow-standard, which projects up through the slot of the plate H, is fitted a handled nut, $H^4$, whereby, by slightly loosening the nut and giving its handle the required movement, the plow can be adjusted horizontally to regulate the width of the prospective furrow. It will be observed that by effecting an exchange of the plow G' of one side beam with that of the other side beam the plow can be caused to throw the dirt or soil in the opposite direction or inward, and thereby be adapted to serve as covering-plows to throw the soil toward or around the plants or seed, as seen in Fig. 1.

I, Fig. 6, is a caster-wheel hung between the prongs of the bifurcated end of a lever, I', pivoted between short uprights $i$ $i$, cast with or fastened to the plates $a$ at the front end of the machine, said wheel being adapted to stand a short distance forward of the front end of the latter. The rear end of the lever I' is connected to and between the arms of a bifurcated upright, J, said arms having coincident vertical slots $j$, which receive from the central beam a screw-thread projection or bolt, $j'$, upon the portion of which projection beyond the arms is fitted a handled nut, $j^2$, to effect the vertical adjustment of the lever, and the consequent raising and lowering of the caster-wheel I.

K K are similar wheels, arranged at the rear end of the machine, and each hung between the arms of forked upright curved spindles $k$, said spindles being journaled in eyes $k'$ of approximately S-shaped or stepped levers K', one being pivoted near its middle to each of the lateral wings of beams, near their rear ends on the inside, through the aperture $k^2$, Fig. 7, in said levers, and suitable pivots or bolts $k^3$, Fig. 1. The forward ends of these levers are formed with vertical cross-pieces $k^4$, each of which is supplied with a similar slot, $k^5$, that receives from each side beam a nutted bolt or screw-threaded projection, $k^6$, whereby the caster-wheels can be vertically adjusted. These caster-wheels, including the one at the front end of the machine, enable the conversion or contrivance of the cultivator into a wheeled machine to permit its transportation from place to place about the field without allowing the contact of its plows with the ground, which is undesirable.

L is the draft-clevis, which is of ordinary construction, and connected to the upper ends of the short uprights $i$ of the front end of the machine.

It will be observed that my combined plow and cultivator is so constructed that the plow-shovels G' and their standards G, Fig. 1, may be readily removed and superseded by the shovels M, having standards M', Fig. 10, when suitable to the work to be performed.

Having fully described my invention, I claim and desire to secure by Letters Patent—

1. In a cultivator, the combination of the saddle-plate F, having parallel plate $d$, partition or flange $f^5$, bolts $f'$ $f'$, arms or plates E, having hooked bolt $f^2$, thumb-nut $f^3$, central beam, A, and lateral or swinging beam B, substantially as shown, and for the purpose described.

2. In a cultivator, the combination, with the central beam, the side hinged beams, and the hinged arms of the latter, of the saddle-plate composed of an upper and lower plate bolted together, and one having a depending flange and hooked bolt, substantially as and for the purpose set forth.

3. In a cultivator, the combination of the T-shaped plate-lever H'', having sleeve $h^7$ and cross-piece $H^2$, handled nut $H^4$, pivoted plate H, having slots $h^2$, screw-bolts $h^3$, having adjusting-nuts $h^4$, and plows G', substantially as shown, and for the purpose described.

4. In a cultivator, the combination, with its beam and plow-standard, of the plate-lever, with an eye or sleeve about its middle, a slot at one end and turned upward at its opposite end, the T-plate having an angular eye or aperture at one end, a middle diagonal portion, and a horizontal transverse slot at its other end, and adjusting or securing nuts, substantially as and for the purpose set forth.

In testimony whereof I affix my signature in presence of two witnesses.

HUGH REA.

Witnesses:
L. C. YOUNG,
J. NOTA McGILL.